(12) United States Patent
Garver

(10) Patent No.: US 7,017,602 B2
(45) Date of Patent: Mar. 28, 2006

(54) LIGHTED PORTABLE FRESH WATER DIVERTER

(76) Inventor: Lee A. Garver, 3901 Etheredge St., Indian Trail, NC (US) 28079

( * ) Notice: Subject to any disclaimer, the term of this patent is extended or adjusted under 35 U.S.C. 154(b) by 0 days.

(21) Appl. No.: 10/331,077

(22) Filed: Dec. 27, 2002

(65) Prior Publication Data

US 2006/0021655 A1   Feb. 2, 2006

(51) Int. Cl.
*F16L 3/00* (2006.01)
(52) U.S. Cl. .................. 137/343; 137/355.27; 239/19; 239/271; 239/276
(58) Field of Classification Search ............... 137/343, 137/355.27; 239/18, 19, 271, 276
See application file for complete search history.

(56) References Cited

U.S. PATENT DOCUMENTS 5,996,142 A * 12/1999 Colman .......................... 4/615
6,098,900 A *  8/2000 Smith ........................... 239/201

* cited by examiner

*Primary Examiner*—A. Michael Chambers
(74) *Attorney, Agent, or Firm*—Donald W. Meeker

(57) ABSTRACT

A water diverter has a double hose connection, a spigot and an outdoor light all mounted on a movable stake for providing an extra faucet at any desired location. The diverter allows a hose connection to another location, such as a recreational vehicle water supply, thereby extending the water source. The light on the water diverter is automatic, turning on at dusk, providing illumination that is required for safety and security purposes.

6 Claims, 1 Drawing Sheet

LIGHTED PORTABLE FRESH WATER DIVERTER

BACKGROUND OF THE INVENTION

1. Field of the Invention

The present invention relates to water distribution and outdoor water connections and in particular to a water diverter with a double hose connection, a spigot and an outdoor light all mounted on a ground stake for providing an extra faucet at any desired location which will be lighted and also allowing a hose connection to another location, such as an RV water supply, taken from an original water spigot such as a camp ground water spigot.

2. Description of the Prior Art

Campgrounds provide a water spigot with each campsite normally. Often the spigot is at the back of the campsite in an inconvenient and very often at night a dark location. It is desirable to have an outdoor water spigot in more convenient locations at a campsite for various uses such as washing dishes, cleaning fish, washing mud or sand from feet and many other uses.

Furthermore, at night, campsites are usually very dark with no outdoor lighting. The area surrounding an RV, camper, tent, or other mobile accommodation located in the campsite is often in need of lighting at night to move around the campsite for various reasons including going to the water spigot. It is desirable to provide an outdoor light for night activity around the campsite. While extenders with faucets and hose connectors exist, including the first one on a stake, none have a light attached.

U.S. Pat. No. 5,390,691, issued Feb. 25, 2002 to Sproule, provides a bleed valve apparatus for the fresh water system of a camping vehicle. The apparatus is interposed between a garden hose and the female hose coupling of the plumbing system of the camping vehicle. The apparatus includes a housing which contains three ends, one of which has a mating coupling for the camping vehicle plumbing system. A second end may be coupled to the garden hose. The third end is isolated from the other ends by a water valve which may be opened to allow the apparatus to serve as an outdoor faucet at the camping vehicle or to serve to allow water to drain from the camping vehicle plumbing when the user of the camping vehicle desires to disconnect from the external water system provided through the hose. The configuration of the apparatus allows a garden hose to be routed from the camping vehicle to a water hydrant with few required bends along the hose.

U.S. Pat. No. 5,983,419, issued Nov. 16, 1999 to Carroll, describes an outdoor shower and spigot apparatus primarily contained within a post. A hose connector is positioned on the lower end of the post and water is supplied to a spigot and shower through a water feed pipe which is positioned within the post and connected to the hose connector. A garden hose provides water to the hose coupling and a second garden hose may be connected to the spigot. In a preferred embodiment, the post is temporarily mounted in position such that it may be easily relocated.

U.S. Pat. No. D457,605, issued May 21, 2002 to Balish, Jr., illustrates the ornamental design for an outdoor shower, as shown and described.

CAMCO'S Water Diverter™, is a water diverter with easy hose gripper, sold online at (http://www.camco-mfg-online.com/camco-mfg-online/products/water3.html). Promotional material states: "Need an extra faucet outside your RV? If so, CAMCO'S Water Diverter With Easy Hose Gripper is your answer. This all metal (brass & copper) threaded faucet attaches to a standard garden hose, allowing you to wash your RV and car, or rinse mud and sand from the kids, all without disconnecting the RV water hook-up. Also acts as a pressure release during disconnection. With Easy Hose Gripper for easy, secure connection to hook-up."

The Hedge Hydrant is online at http://www.plowhearth.com/productform.asp. Promotional material states: "Eliminate Hard-To-Reach Faucets. Why crawl under scratchy hedges and plantings to connect your hose to the faucet? Install our Hedge Hydrant extension hose and you won't have to go through that this year. The 400-lb. test hose comes with non-corroding brass fittings and faucet on a galvanized angle iron stake. We offer the hydrant with either a 5 or 10 ft. connector hose on a 13"H stake. Our Tall Hydrant has a 10 ft. hose and a taller 22"H stake that lets you fit a watering can or bucket under its faucet."

A Hose Stand apparatus, which can be viewed at a web site online at: http://www.modmerc.com/sstore/items/8059.html. Promotional material states: "Extend water service anywhere in your yard, garden or orchard! Add a hose bibb and hose storage rack to your place fast and economically! Durable 12 gauge steel construction, gusset reinforced hose rack, powder-coated finish and top quality brass Nibco hose bibbs. Hose rack holds up to 150' of ⅞" garden hose. Available in two styles that adapt to any water system. Both units are 42" tall and are designed to be mounted in compacted soil or set in concrete. Bibb-Rak (item #8058) connects with built-in PVC adapter to underground water system. Hose Stand model includes a female brass connector for easy attachment to a garden hose."

A Hose Stand apparatus on a stake with a faucet can be viewed online at: http://store.yahoo.com/harrietcarter/hosestand.htm. Promotional material states: "Hose stand with spigot puts outdoor faucet in easy reach. Stop climbing over shrubs or stepping on plants to get to your nearest faucet! Six foot vinyl hose extender screws into any faucet, while your garden hose attaches to the stand's brass spigot. Stand stakes anywhere; also stores hose between uses. Enameled steel. 39" H."

What is needed is an extender faucet, with a double hose connection on a movable stake to position as desired on the campsite or in the yard, as well as a light for night use of the faucet and general safety on a campsite or in a yard or other outdoor location at night.

SUMMARY OF THE INVENTION

An object of the present invention is to provide a spigot on a stake with hose connections to allow a hook up for RV's (motor homes, travel trailers, tents, etc.) to a campsite's fresh water source with an additional water spout or spigot.

Another object of the present invention is to provide a spigot on a stake with hose connections and long hoses to allow flexibility of location for a water diverter when hooking up to a fresh water faucet.

One more object of the present invention is to provide any desired length hoses with the spigot on the stake to provide the capability of extending the distance from the original faucet location to the desired connection.

A further object of the present invention is to allow for additional multiple water source connections by way of adding an additional faucet and connection sources.

A contributory object of the present invention is to provide a darkness actuated light on the stake with the spigot so that the water source that is safe for outdoor usage at night.

A related object of the present invention is to provide the light on the movable stake to allow for additional security to the campsite by lighting up the surrounding area of the portable stake.

In brief, the lighted portable fresh water diverter of the present invention is an accessory that gives the RV'r and camper the added water source necessary when hooking up to a campsite. Traditionally, campsites provide only one fresh water faucet per campsite to which a single hose is connected to supply water for the camper, thereby eliminating the outdoor faucet. The present invention allows the camper to hook up to the only spigot source connecting to the camper, plus have an additional outdoor faucet or spigot available to be used as necessary (washing hands, cleaning fish, washing dishes, and/or watering plants etc.). Unlike other diverters currently on the market that connect to the RV or directly to the site's faucet, the present invention can be placed exactly where it would best suit the camper.

The portable spigot and water diverter of the present invention is lighted. This feature provides the necessary light that is required for safety and security purposes. The light is activated by light sensitivity and automatically comes on at dusk and turns itself off at a pre-set time or at dawn. Its electrical source shall be safe for outdoors use.

An advantage of the present invention is to allow hook up for RV's (motor homes, travel trailers, tents, etc.) to a campsite's fresh water source.

Another advantage of the present invention is to provide flexibility of location when hooking up to a fresh water faucet.

An additional advantage of the present invention is the capability of extending the distance from the original faucet location to the desired connection.

Yet another advantage of the present invention is to allow for additional multiple water source connections by way of adding an additional faucet and connection sources.

Still another advantage of the present invention is to provide a light at the source that is safe for outdoor usage.

A further advantage of the present invention is to allow for additional security to the campsite by lighting up the area.

An ensuing advantage of the present invention is in providing additional mobility safety to the campsite by illuminating the area where electrical cords and fresh water hoses are lying on the ground.

Another advantage of the present invention is the light on the device being automatic, turning itself on at dusk and turning off at a preset time or at dawn.

BRIEF DESCRIPTION OF THE DRAWINGS

These and other details of my invention will be described in connection with the accompanying drawing, which is furnished only by way of illustration and not in limitation of the invention, and in which drawing.

BEST MODE FOR CARRYING OUT THE INVENTION

Figure 1:
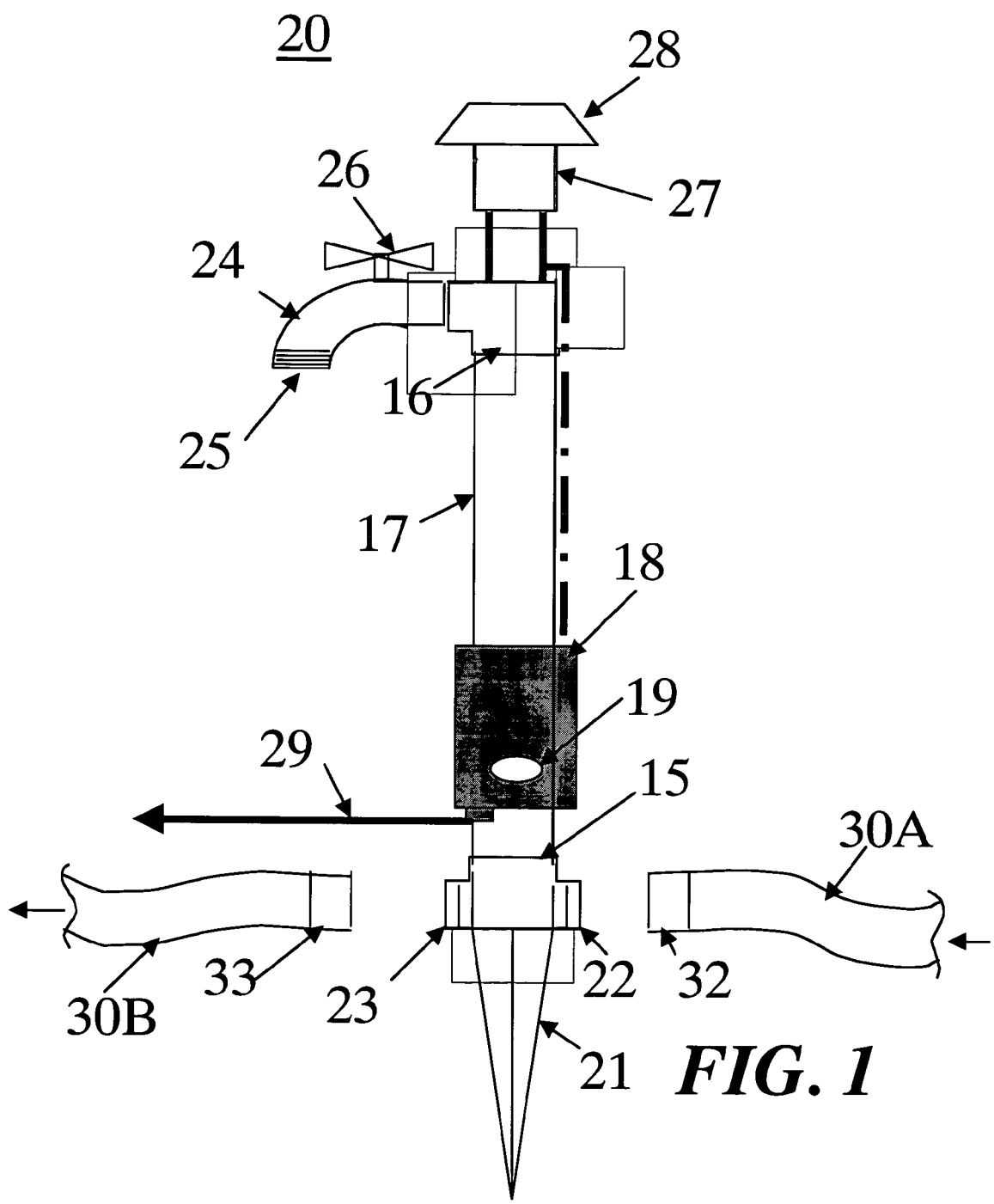
FIG. 1 is a diagrammatic side elevational view of the water diverter stake device of the present invention.

In FIG. 1, an outdoor water diverter device comprises a ground stake 20 for positioning in any desired outdoor location by sticking the bottom point 21 of the stake in the ground.

The device also comprises a water receiving inlet 22, in the form of a stake hose connector, mounted on the ground stake 20 that receives water through a hose 30A, having a mating hose connector 32, from a water source, such as an outdoor spigot at a campsite or in a yard.

The diverter device further comprises a water distributing outlet 23, such as another stake hose connector, that is mounted on the ground stake 21 that communicates with the inlet 22 to distribute water, via a hose 30B with a hose connector 33, to another desired location for dispensing water such as a water supply in an RV or camper.

The device 20 also includes a spigot 24 mounted on the ground stake 20, which communicates with the inlet 22 and dispenses water at the desired location of the device where the stake point 21 is inserted in the ground for outdoor use. The spigot 24 comprises a control handle 26 and a faucet outlet 25.

The diverter also comprises a outdoor light 27 that is mounted on top of the stake 21, out of contact with the water systems. A power cord 29 connects the outdoor light 27 with a source of electric power to illuminate the light 27. The outdoor light 27 is shielded by a top shade 28 that prevents the light from shining upwardly, thereby illuminating the ground below and around the diverter. The light 27 would be activated by a light sensitivity switch 19, responsive to ambient light conditions, and automatically come on at dusk and turn itself off at a pre-set time or at dawn. The light 27 would be attached to the diverter with stainless steel screws to prevent rusting.

A junction box 18 is also used to house the light sensitivity switch 19. The junction box 18 would be weather sealed and protected to guard against electrocution The body 17 of the diverter would be made of fresh water ¾" PVC piping or another suitable material, at a preferable length of 32". The body-base connector 15 and the faucet-body connector 16 would be fixed to the body 17 by PVC type cement or other suitable means.

In practice a camper would first select a desired area in which to position the water diverter device. The device would then be located in that area by pushing the stake point 21 in a downwardly motion into the ground. Fresh water from the campsite's source could be hooked up to the device by a hose 30A, by fitting the hose connector end 32 into the water receiving inlet 22. The water could then be hooked up for the camper's usage in their RV via a hose 30B, by inserting the hose connector end 33 onto the water distributing outlet 23. The spigot 24 could be used to wash hands, do dishes, clean fish etc. by diverting water to the faucet opening 25 by turning the control handle 26. To illuminate the light 27 the user would plug the power cord 29 into a 120VAC outlet provided at the camp ground or at a residence.

It is understood that the preceding description is given merely by way of illustration and not in limitation of the invention and that various modifications may be made thereto without departing from the spirit of the invention as claimed.

What is claimed is:

1. An outdoor water diverter device for supplying water from an outdoor spigot to a recreational vehicle and diverting water to another spigot mounted on the device, the device comprising:
   a ground stake having a bottom point adapted for removable insertion into a ground surface for removably positioning the device in any desired outdoor location;
   an inlet to receive water, the inlet mounted on the ground stake, the inlet adapted for receiving water from a first water conduit having a proximal end of the first water conduit attached to the inlet and a distal end of the first water conduit removably attached to an outdoor water spigot;

a spigot to dispense water mounted on the ground stake in communication with the inlet for dispense water at the desired outdoor location;

an outlet to distribute water to another source, the outlet mounted on the ground stake in communication with the inlet, the outlet adapted for transferring water from the inlet to a second water conduit having a proximal end of the second water conduit attached to the outlet and a distal end of the second water conduit removably attached to a water supply of a recreational vehicle, the device thereby serving as a water supply hook-up between the outdoor spigot and the recreational vehicle;

a light source mounted on the ground stake, the light source adapted for illuminating an area surrounding the ground stake.

2. The device of claim 1 wherein the inlet comprises a connector for receiving a hose connection and the first water conduit comprises a first hose with a first hose connection mating with the inlet hose connection, the first hose adapted for transporting water from the outdoor spigot and the outlet comprises a connector for receiving a hose connection and the second water conduit comprises a second hose with a second hose connection mating with the outlet hose connection, the second hose adapted for transporting water to a recreational vehicle water supply system.

3. The device of claim 1 wherein the light source comprises a low wattage outdoor shielded light for illuminating the ground below and around the light.

4. The device of claim 3 wherein the low wattage outdoor light is mounted on top of the stake out of contact with the water systems and a power cord connects the outdoor light with a source of electric power to light the light.

5. The device of claim 4 wherein the outdoor light further comprises a top shade to prevent the light from shining upwardly.

6. The device of claim 4 further comprising a light sensing activating means adapted for activating the light is response to ambient light conditions.

* * * * *